(12) United States Patent
Huang

(10) Patent No.: US 9,598,869 B2
(45) Date of Patent: Mar. 21, 2017

(54) NATURAL CONVECTION ROOF DEVICE

(71) Applicant: Daniel Huang, Taichung (TW)

(72) Inventor: Daniel Huang, Taichung (TW)

(*) Notice: Subject to any disclaimer, the term of this patent is extended or adjusted under 35 U.S.C. 154(b) by 0 days.

(21) Appl. No.: 14/979,298

(22) Filed: Dec. 22, 2015

(65) Prior Publication Data

US 2016/0130817 A1   May 12, 2016

Related U.S. Application Data

(63) Continuation-in-part of application No. 13/756,546, filed on Feb. 1, 2013, now abandoned.

(51) Int. Cl.
| | |
|---|---|
| F24F 7/02 | (2006.01) |
| F24F 13/08 | (2006.01) |
| E04D 13/17 | (2006.01) |
| A01K 1/00 | (2006.01) |
| A01G 9/24 | (2006.01) |

(52) U.S. Cl.
CPC ............ *E04D 13/174* (2013.01); *A01G 9/24* (2013.01); *A01K 1/0058* (2013.01); *F24F 7/02* (2013.01)

(58) Field of Classification Search
CPC .................................. E04D 13/174; F24F 7/02
See application file for complete search history.

(56) References Cited

U.S. PATENT DOCUMENTS

| | | | |
|---|---|---|---|
| 2,625,094 A | 1/1953 | Bonforte | |
| 3,481,263 A * | 12/1969 | Belden | E04D 13/174 454/365 |
| 3,919,927 A | 11/1975 | Bernard, Jr. | |
| 4,189,989 A | 2/1980 | Maze | |
| 4,545,291 A | 10/1985 | Kutsch et al. | |
| 4,621,569 A * | 11/1986 | Fioratti | A01K 1/0058 454/364 |
| 4,850,265 A | 7/1989 | Raisanen | |
| 5,050,489 A * | 9/1991 | Mankowski | F24F 7/02 454/365 |
| 5,052,286 A | 10/1991 | Tubbesing et al. | |
| 5,112,278 A | 5/1992 | Roberts | |
| 5,593,348 A | 1/1997 | Rickert | |
| 5,603,657 A | 2/1997 | Sells | |

(Continued)

FOREIGN PATENT DOCUMENTS

TW        I374212        10/2012

*Primary Examiner* — Steven B McAllister
*Assistant Examiner* — Jonathan Cotov
(74) *Attorney, Agent, or Firm* — Muncy, Geissler, Olds & Lowe, P.C.

(57) ABSTRACT

A natural convection roof device includes a first roof drainage panel, a first extended roof drainage panel, a second roof drainage panel, an inner barrier and an inner roof containing an inner ventilation opening disposed obliquely to the first roof drainage panel. The top end of the first roof drainage panel includes the first extended roof drainage panel, and the top end of the first extended roof drainage panel is assembled with the second roof drainage panel and the inner barrier. The bottom ends of the second roof drainage panel and the inner barrier are installed on the inner roof. The lower side of the inner barrier is center ventilation openings. Above the second roof drainage panel is ventilation holes, and below the second roof drainage panel is drain holes. The level of the ventilation holes is higher than that of the inner ventilation opening.

5 Claims, 5 Drawing Sheets

(56) References Cited

U.S. PATENT DOCUMENTS

| | | | |
|---|---|---|---|
| 5,797,222 A * | 8/1998 | Martin | E04D 13/174 454/365 |
| 6,128,870 A | 10/2000 | Kohler | |
| 6,966,156 B2 | 11/2005 | Dixon | |
| 6,976,337 B2 | 12/2005 | Hiraki | |
| 7,024,829 B2 * | 4/2006 | Sharp | E04D 13/174 454/250 |
| 7,250,000 B2 | 7/2007 | Daniels, II | |
| 7,485,034 B2 * | 2/2009 | Sells | F24F 7/02 454/365 |
| 7,694,467 B2 | 4/2010 | Lin | |
| 8,291,655 B2 | 10/2012 | McGlothlin | |
| 8,322,088 B2 * | 12/2012 | Huang | E04D 13/174 454/365 |
| 8,534,013 B2 | 9/2013 | Rodriguez, Jr. | |
| 8,615,943 B2 | 12/2013 | Rodriguez, Jr. | |
| 8,726,593 B2 * | 5/2014 | Krenz | E04D 13/178 52/198 |
| 8,763,325 B2 | 7/2014 | Rodriguez, Jr. | |
| 8,790,167 B2 | 7/2014 | Holland et al. | |
| 9,003,717 B2 | 4/2015 | Barre et al. | |
| 2001/0052207 A1 | 12/2001 | Davis | |
| 2002/0187745 A1 * | 12/2002 | Smith | E04D 1/3402 454/365 |
| 2002/0194799 A1 * | 12/2002 | Sharp | E04D 13/174 52/198 |
| 2004/0144040 A1 * | 7/2004 | Fulford | E04D 13/174 52/57 |
| 2005/0202779 A1 * | 9/2005 | Smith | E04D 13/174 454/365 |
| 2008/0318516 A1 * | 12/2008 | Rotter | E04D 13/174 454/365 |
| 2009/0178351 A1 * | 7/2009 | Lin | E04D 13/174 52/198 |
| 2010/0112932 A1 | 5/2010 | Grubka et al. | |
| 2010/0255769 A1 | 10/2010 | Farr | |
| 2011/0099924 A1 * | 5/2011 | Huang | E04D 13/174 52/198 |
| 2011/0201266 A1 * | 8/2011 | Henderson | F24F 7/02 454/365 |
| 2012/0144763 A1 | 6/2012 | Antonic | |
| 2012/0304567 A1 | 12/2012 | Baker et al. | |
| 2013/0023200 A1 | 1/2013 | Lepage | |

* cited by examiner

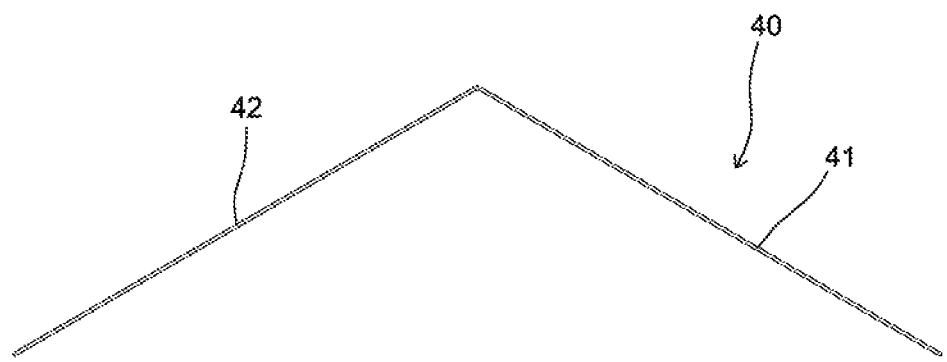
F I G. 4

NATURAL CONVECTION ROOF DEVICE

RELATED APPLICATION

This application is a Continuation-In-Part of currently pending U.S. patent application Ser. No. 13/756,546 filed on 2013 Feb. 1.

BACKGROUND OF THE INVENTION a) Field of the Invention

The present invention relates to a building, and more particularly to a natural convection roof device which can be installed on the roof of a greenhouse, heat pipe, warehouse, animal house or transportable building used in agriculture, industry and business, in addition to the roof on an ordinary fixed building. The natural convection roof device ventilates and stops rain, and some roof devices can protect with multi-layers. Hot air in a building flows upward to an inner ventilation opening from bottom to top, through center ventilation openings and is then discharged from ventilation holes without being affected by the potential drop, so that there is no need to press down the hot air. An inner barrier is used to provide the function for stopping the counter flow rain and to allow the rain to blast the rain which flows upward against the stream from drain holes by free falling upon entering into the building from the ventilation holes, so that the rain can be discharged successfully from the drain holes. Furthermore, the hot air in the building is discharged out of the building, whereas cold air is drawn in by natural convection.

b) Description of the Prior Art

A conventional building absorbs heat easily and does not dissipate heat easily when being exposed to sunlight. In particular, a concrete building absorbs heat easily and does not dissipate heat easily once being exposed to sunlight for a long time in a daytime, which increases the indoor temperature. Furthermore, as hot air ascends from bottom to top, the indoor temperature will be increased continuously. Therefore, during the summer, the interior of the building is still very hot even in the night.

There are several cooling methods used often nowadays. However, their effects are inferior. Some vendors will install a fixed sprinkler on the roof, which requires additional hoses and water loops. Besides that, a water switch needs to be turned on manually or an automatic water switch has to be installed. This wastes water resources, and the area of sprinkling is incomplete and non-uniform to limit the cooling effect. Other vendors will install a cooling fan on the roof to discharge hot air by forced convection of rotation. However, the cost of the cooling fan is high and the roof needs to be cut when implementing the cooling fan. Therefore, the cooling effect is still limited.

Some vendors will change the building materials. However, the heat-proofed or heat-isolated building materials are expensive.

It can be seen that there is a small rooftop on the apex of a ridge on a conventional building. Two sides of that small rooftop ventilate and can be installed with a window, blind or net to discharge hot air in the building through the two sides of the small rooftop. However, when it is raining or a hurricane comes, the rain with strong wind can also permeate into the building through the window, which is not helpful.

On the other hand, a small eave (or attic) can be installed on a side of a pitched roof. The small eave is also provided with a window, blind or net to discharge hot air in the building through the window, which also results in the abovementioned shortcoming that when it is raining or a hurricane comes, the rain with strong wind can permeate into the building through the window too, which is not helpful.

The two rooftop cooling methods described above are all based on the principle of air convection to dissipate hot air in the building. It means that when hot air in the building ascends, hot air can be dissipated out through windows on a little rooftop (eave). Although there is no need to use power to dissipate heat effectively, rain along with strong wind may also penetrate into the building through the windows, resulting in counter flow wind and dripping rain, which is the most disturbing thing.

FIG. 1 shows a cutaway view of a first prior art, the U.S. Pat. No. 6,966,156. An interior of a roof 20 is provided with a ventilating duct 21, two sides of the ventilating duct 21 are provided respectively with a weather-blocking panel 22, above the weather-blocking panels 22 are plural vents 23, and below the weather-blocking panels 22 are exhaust orifices 24. In addition, an interior of each weather-blocking panel 22 is provided with a valve switch 25. When hot air in the building rises up along the ventilating duct 21 and flows into the weather blocking panels 22 through the vents 23, the valve switch 25 are opened to dissipate hot air from the exhaust orifices 24.

To shield from rain, the roof 20 in the abovementioned invention is sealed and hot air is concentrated in the ventilating duct 21 based upon the principle of hot air rising. However, as the exhaust orifices 24 are lower than the outlet of the ventilating duct 21 by a potential drop h1, the force of heat flow in the ventilating duct 21 must be much larger than the potential drop h1 of the exhaust orifices 24 that heat can be dissipated out by the power of the rising hot air. Besides that, as the exhaust orifices 24 for dissipating heat is faced downward, hot air is often concentrated in the ventilation duct 21 and cannot be dissipated successfully. Although the roof 20 can shield from counter flow rain, the effect of heat dissipation is not perfect.

FIG. 2 shows a cutaway view of a second prior art, the U.S. Pat. No. 5,052,286. A lower part at two sides of a roof 30 is provided with plural ventilation holes 31, and the lowest parts at two sides of the roof 30 are also provided with drain holes 32. To shield from rain, the roof 30 is sealed and hot air is concentrated above the roof 30 based upon the principle of hot air rising. The ventilation holes 31 and the drain holes 32 are lower than the region where heat is concentrated; therefore, the force of heat flow at the heat-concentrated region must be much larger than the potential drops h2, h3 of the ventilation holes 31 and the drain holes 32 that heat can be dissipated out by the power of hot air rising. In addition, as the ventilation holes 31 and the drain holes 32 for dissipating heat are faced downward, hot air is often concentrated in the heat-concentrated region and the effect of heat dissipation is not perfect.

Accordingly, to solve the abovementioned shortcomings, the present inventor has already filed the application of invention patent No. 09813370, "Ventilation and Rain Stopping Device without using Power," to the Intellectual Property Office of Taiwan and has been issued with the patent No. I374212 (the present inventor also has applied for the U.S. patent Ser. No. 12/590,223, "Ventilated Roofing Structure," and has been issued with the U.S. Pat. No. 8,322,088).

FIG. 3 shows a cutaway view of a third prior art, wherein a roof 10 on a building includes a first roof drainage panel 11, second roof drainage panels 12 and inner barriers 13. The first roof drainage panel 11 is an upper roof with multiple layers, and there are two second roof drainage panels 12 disposed at a left and right side of the first roof drainage panel 11. The first roof drainage panel 11 is a cone-shaped rooftop which is extended downward by a certain distance to a center ventilation opening 14. The space between the center ventilation opening 14 and the cone-shaped rooftop is covered by the first roof drainage panel 11. The first roof drainage panel 11 is provided with a tail end B1 which is in adjacent to the center ventilation opening 14. The second roof drainage panels 12 are connected above the tail end B1 of the first roof drainage panel 11 and are disposed outside the first roof drainage panel 11. In this embodiment, the second roof drainage panels 12 are vertical, which keeps an outer ventilation opening 15 between the top ends A1 of the second roof drainage panels 12 and the first roof drainage panel 11. The inner barriers 13 are formed by extending the roof 10 upward and are connected below the tail end B1 of the first roof drainage panel 11; whereas, there are inner ventilation openings 16 between the inner barriers 13 and the first roof drainage panel 11. In this invention, the relationship among the first roof drainage panel 11, the second roof drainage panels 12 and the inner barriers 13 are that the top ends A1 of the second roof drainage panels 12 are higher than the tail end B1 of the first roof drainage panel 11, and the tail end B1 of the first roof drainage panel 11 is disposed between the top ends A1 of the second roof drainage panels 12 and the inner barriers 13.

SUMMARY OF THE INVENTION

Accordingly, the present invention discloses a natural convection roof device. The primary object of the natural convection roof device is to provide natural convection to discharge hot air in the building and draw in cold air to cool down the building naturally without using any power. There is no need to have a huge force of heat flow inside the roof and there is no potential drop. Hot air inside the roof is discharged upward and can be expelled out successfully.

Another object of the present invention is to provide a natural convection roof device, wherein an inner barrier is provided to stop counter flow rain and to allow the rain to blast the rain which flows upward against the stream from drain holes by free falling upon entering into the building from ventilation holes, so that the rain can be discharged successfully from the drain holes. In addition, as the top end of an inner roof provides a secondary function for stopping the rain, there is no concern that the rain can flood into the roof.

Still another object of the present invention is to provide a natural convection roof device which can be installed on the roof of a greenhouse, chimney, heat pipe, warehouse, animal house or transportable building used in agriculture, industry and business. The natural convection roof device ventilates and stops rain, and some roof devices can protect with multi-layers to be applied to a coastal zone or a strong-wind area, preventing from rain flooding into the building during strong wind.

Accordingly, hot air in a building flows upward to an inner ventilation opening from bottom to top, through center ventilation openings and is then discharged out from ventilation holes without being affected by the potential drop, so that there is no need to press down the hot air. An inner barrier is used to provide the function for stopping the counter flow rain and to allow the rain to blast the rain which flows upward against the stream from drain holes by free falling upon entering into the building from the ventilation holes, so that the rain can be discharged successfully from the drain holes, thereby achieving the objects of natural air ventilation and shielding from rain.

To enable a further understanding of the said objectives and the technological methods of the invention herein, the brief description of the drawings below is followed by the detailed description of the preferred embodiments.

BRIEF DESCRIPTION OF THE DRAWINGS

FIG. 4 shows a plan view of a conventional roof.

DETAILED DESCRIPTION OF THE PREFERRED EMBODIMENTS

Figure 1:
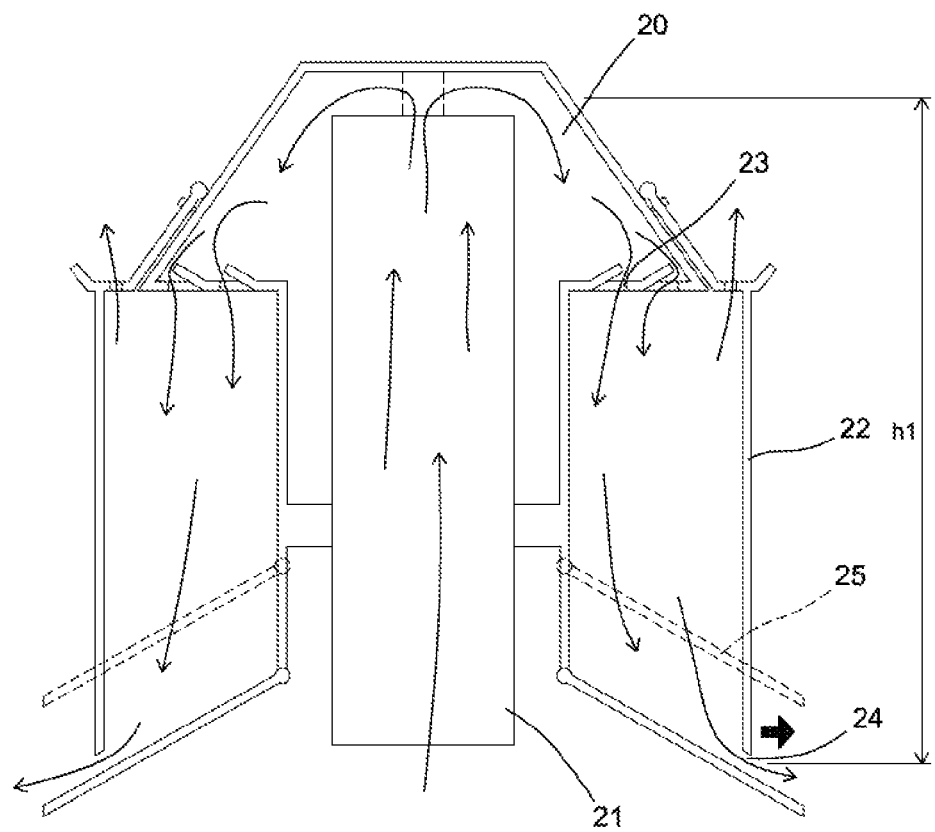
FIG. 1 shows a plan view of a first prior art.
Figure 2:
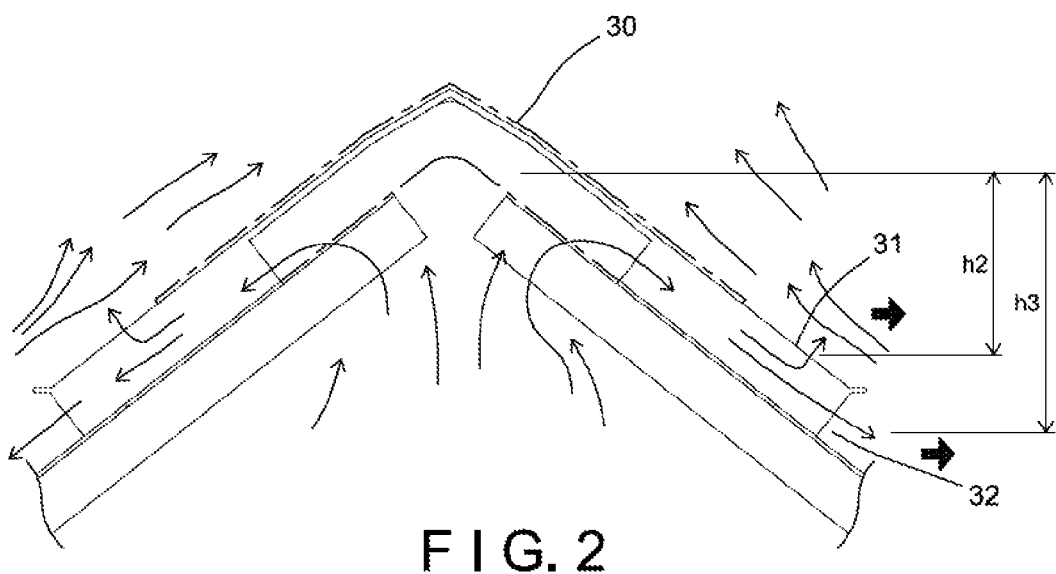
FIG. 2 shows a plan view of a second prior art.
Figure 3:
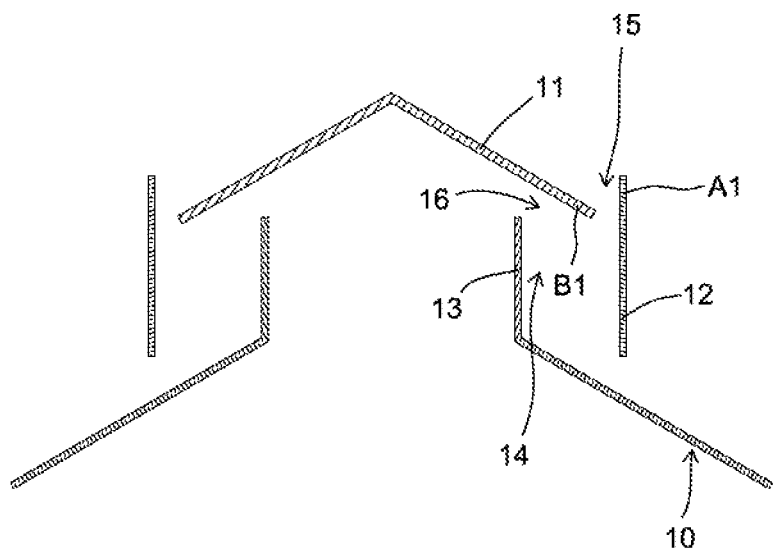
FIG. 3 shows a plan view of a third prior art.
Figure 5:
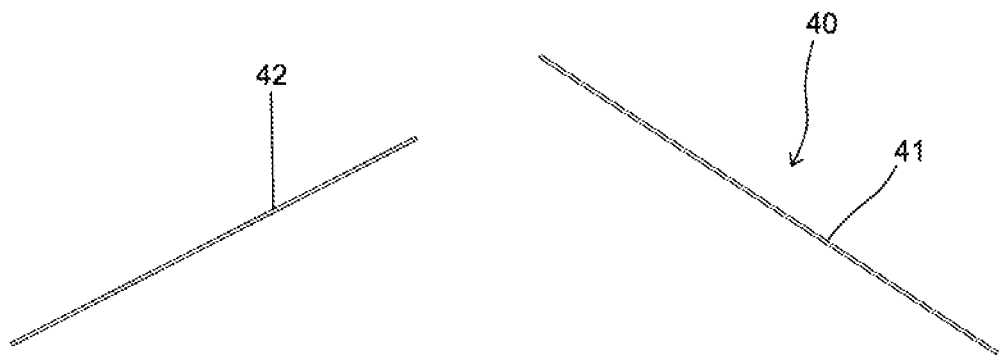
FIG. 5 shows a plan view of dismantling part of an inner roof during implementing the present invention.
Figure 6:
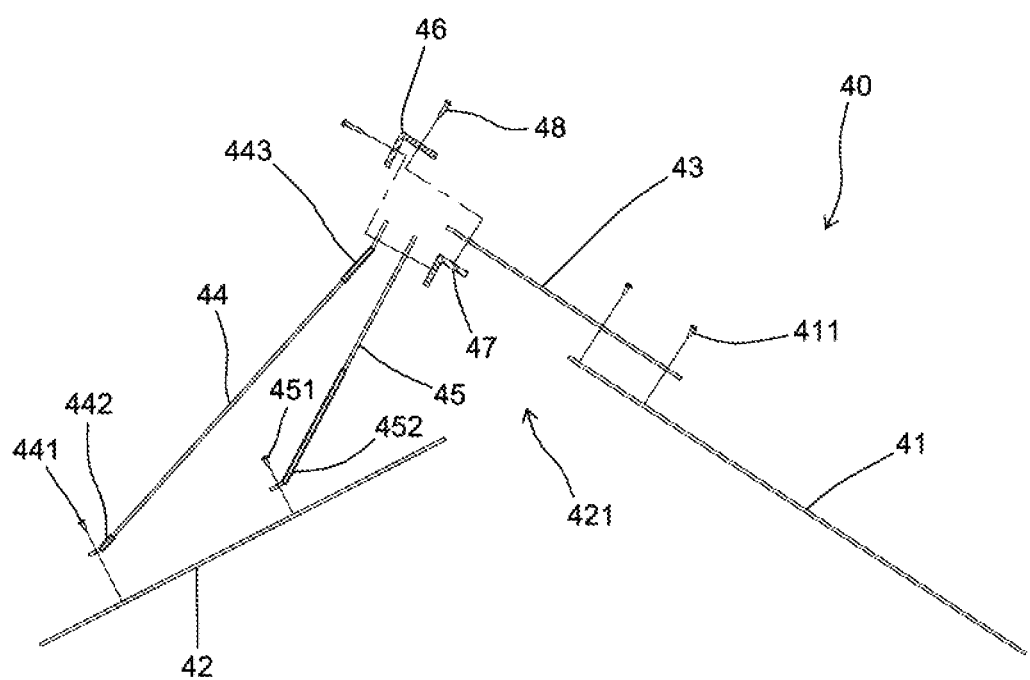
FIG. 6 shows a planar exploded view of the present invention.
Figure 7:
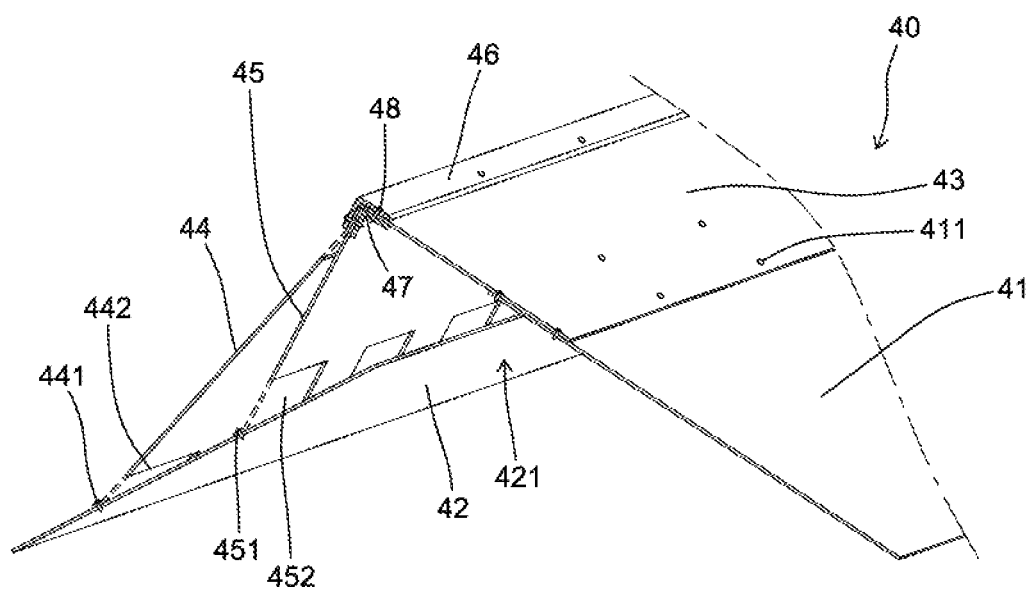
FIG. 7 shows a three-dimensional view of assembly of the present invention.

Referring to FIGS. 5 to 6, an interior of a roof 40 (as shown in FIG. 4) on an ordinary building is provided with cross beams and stand columns for support (the cross beams and the stand columns belong to the common technology and therefore no further description is disclosed). The roof 40 is combined obliquely by a first roof drainage panel 41 and an inner roof 42, wherein part of the top end of the inner roof 42 is dismantled (as shown in FIG. 5). The roof 40 includes the first roof drainage panel 41, a first extended roof drainage panel 43, a second roof drainage panel 44 and an inner barrier 45. As part of the building material has been dismantled from the top end of the inner roof 42, the voided part becomes an inner ventilation opening 421, enabling the first roof drainage panel 41 to be exposed. At the top end of the first roof drainage panel 41, the first extended roof drainage panel 43 is fixed by plural screws 411, so that the first extended roof drainage panel 43 can be locked on the first roof drainage panel 41. The first extended roof drainage panel 43 is a building board; whereas, the second roof drainage panel 44 and the inner barrier 45 are assembled on the top end of the first extended roof drainage panel 43.

Figure 8:
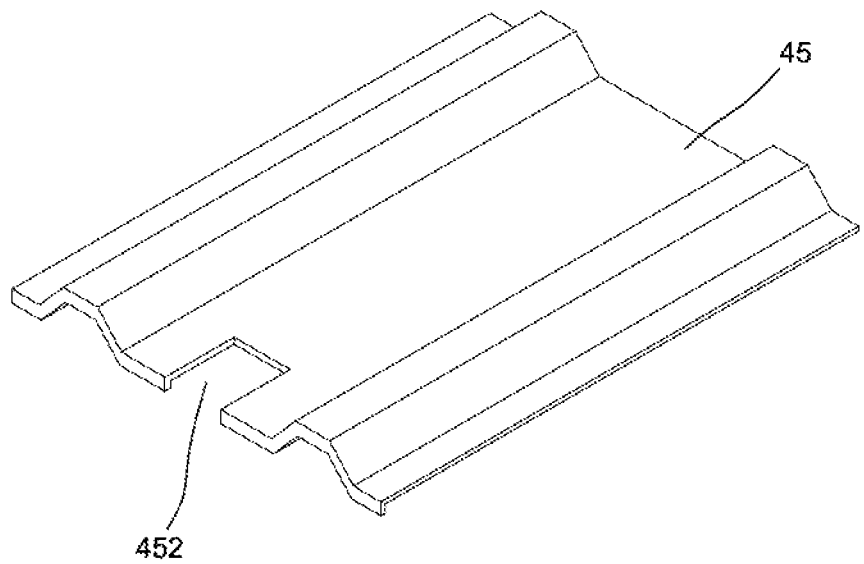
FIG. 8 shows a three-dimensional view of the inner roof of the present invention.
Figure 9:
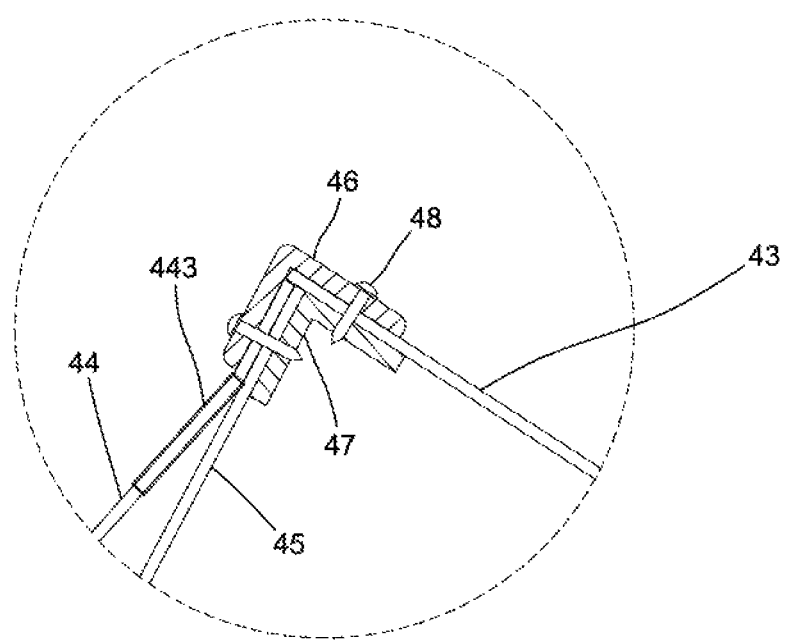
FIG. 9 shows an enlarged cutaway view of the present invention wherein a second roof drainage panel and an inner barrier are assembled at a first roof drainage panel.

Referring to FIGS. 6 to 9, the second roof drainage panel 44 and the inner barrier 45 are assembled on the top end of the first extended roof drainage panel 43 (as shown in FIG. 9) by an outer corner plate 46, an inner corner plate 47 and plural screws 48. Both the outer corner plate 46 and the inner corner plate 47 are an L-shaped corner plate, clamping and fixing the second roof drainage panel 44 and the inner barrier 45 on the top end of the first extended roof drainage panel 43. Therefore, the second roof drainage panel 44 and the inner barrier 45 are disposed respectively at the other side of the first extended roof drainage panel 43. In addition, the bottom end of the second roof drainage panel 44 is installed above the inner roof 42 by plural screws 441, and the bottom end of the inner barrier 45 is also installed above the inner roof 42 by plural screws 451, so that the second roof drainage panel 44 and the inner barrier 45 are connected in an inverted-V shape between the top ends of the inner roof 42 and the first extended roof drainage panel 43. There are plural center ventilation openings 452 (as shown in FIG. 8) between the second roof drainage panel 44 and the inner roof 42, there are plural drain holes 442 between the second roof drainage panel 44 and the inner roof 42, and there are plural ventilation holes 443 between the top ends of the second roof drainage panel 44 and the first extended roof drainage panel 43. The level of the ventilation holes 443 is higher than that of the inner ventilation opening 421 and the ventilation holes 443 are disposed above the drain holes 442.

Figure 10:
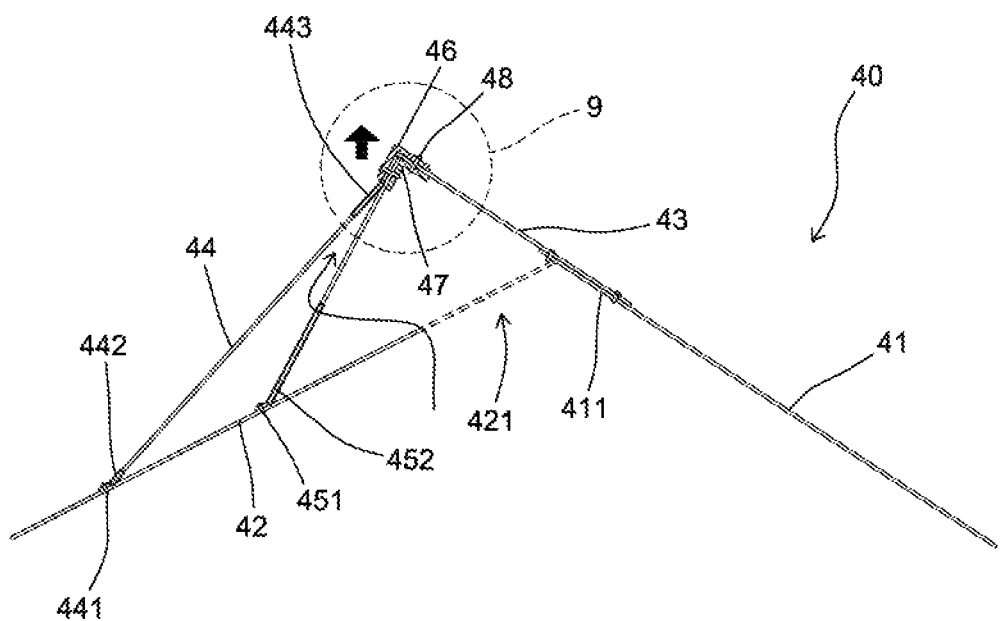
FIG. 10 shows a plan view of assembly of the present invention.

By the abovementioned structures, when sunlight irradiates on the roof 40 and walls, temperature on the roof 40 and walls rises up gradually and cannot drop down soon. Therefore, indoor temperature will rise up accordingly. As shown in FIG. 10, at this time, hot air in the building will flow upward from bottom, hit the inner ventilation opening 421 between the inner roof 42 and the first roof drainage panel 41, go through the center ventilation openings 452 and then be discharged out from the ventilation holes 443. Thus, hot air in the building will be expelled out continuously from bottom to top in an S-shape and outdoor air will be drawn in from other doors and windows, forming natural convection.

As the ventilation holes 443 are close to the topmost part on the roof 40, hot air flows from the inner ventilation opening 421 to the ventilation holes 443 without being affected by the potential drop. In addition, there is no need to press down hot air as in the prior arts. The force of hot air is not required to be larger than outdoor air pressure that the principle of air convection can be applied to draw cold air into the building and discharge hot air, without using any power or manual operation. Furthermore, in addition to discharging heat, people in the building can feel cool wind at any time due to natural convection, and the building can be very cool in the summer; the hotter the day, the more natural convection resulted from buoyancy force. Accordingly, one can enjoy natural air by natural convection and use air conditioning without requiring any power, which in one hand can save power, and in the other hand can prevent from causing infection of germs resulted from a closed space (such as Legionella pneumophila) as natural air is used.

Moreover, when it is raining or blowing a wind, the rain will shower on the first roof drainage panel 41. As the first roof drainage panel 41 is oblique, the rain will flow downward naturally (the first roof drainage panel 41 is made of baking slates or roof tiles, which can definitely expel the rain downward). When it is raining, the inner barrier 45 provides the function for stopping counter flow rain and allows the rain to blast the rain which flows upward against the stream from the drain holes 442 by free falling along the inner barrier 45 upon entering into the building from the ventilation holes 443, so that the rain can be discharged from the drain holes 442 successfully. Furthermore, the top end of the inner roof also provides a secondary function for stopping the rain. Accordingly, the object of natural ventilation and rain shielding is achieved.

The present invention improves the shortcomings in a conventional roof. As the conventional roof is sealed, hot air is discharged downward, and as the ventilation openings are much lower than the opening where heat is concentrated to result in a potential drop, hot air pressure in the building should be larger than this potential drop that hot air in the building can be discharged. On the contrary, the present invention is not affected by the potential drop and the ventilation holes 443 are close to the topmost part on the roof 40; therefore, hot air in the building can be discharged very successfully.

The natural convection roof device disclosed in the present invention can be installed on a roof of greenhouse, heat pipe, warehouse, animal house or transportable building used in agriculture, industry and business, in addition to the roof on a fixed building. The natural convection roof device ventilates and stops rain, and some roof devices can protect with multi-layers to be applied to a coastal zone or a strong-wind area, preventing from rain flooding into the building during strong wind.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:
1. A natural convection roof device comprising:
a roof, the roof being combined by a first roof drainage panel and an inner roof obliquely, with a top end of the inner roof being provided with an inner ventilation opening;
wherein the first roof drainage panel being exposed, the top end of the first roof drainage panel being added with a first extended roof drainage panel, and the top end of the first extended roof drainage panel being assembled with a second roof drainage panel and an inner barrier; wherein a bottom end of the second roof drainage panel being installed above the inner roof, and the bottom end of the inner barrier being also installed above the inner roof, allowing the second roof drainage panel and the inner barrier to be connected in an inverted-V shape between the top ends of the inner roof and the first extended roof drainage panel; plural center ventilation openings being disposed between lower side of the inner barrier and the inner roof; plural drain holes being disposed between the second roof drainage panel and the inner roof; plural ventilation holes being disposed between the top ends of the second roof drainage panel and the first extended roof drainage panel; level of the plural ventilation holes being higher than that of the inner ventilation opening and the plural ventilation holes being disposed above the drain holes; the plural ventilation holes are distributed at the topmost part on the second roof drainage to discharge hot air;
accordingly, hot air in a building flowing to the inner ventilation opening from bottom to top, through the plural center ventilation openings, and then being discharged from the plural ventilation holes without potential drop and there being no need to press down the hot air; the inner barrier providing function for stopping counter flow rain and allowing the air to blast the rain which flows upward against a stream from the drain holes by free falling upon entering into the building from the plural ventilation holes, so that the rain can be discharged successfully from the drain holes, thereby achieving the objects of natural air ventilation and shielding from rain.
2. The natural convection roof device according to claim 1, wherein the second roof drainage panel and the inner barrier are clamped and fixed on the top end of the first extended roof drainage panel by an outer corner plate, an inner corner plate and plural screws, so that the second roof drainage panel and the inner barrier are disposed respectively at another side of the first extended roof drainage panel.

3. The natural convection roof device according to claim 1, wherein the first extended roof drainage panel is locked on the first roof drainage panel by plural screws.

4. The natural convection roof device according to claim 1, wherein the second roof drainage panel is installed on the inner roof by plural screws.

5. The natural convection roof device according to claim 1, wherein the bottom end of the inner barrier is installed on the inner roof by plural screws.

* * * * *